(12) United States Patent
Crunk

(10) Patent No.: US 12,460,622 B2
(45) Date of Patent: Nov. 4, 2025

(54) SYSTEM AND METHOD FOR CLEANING WIND TURBINE BLADES AND SOLAR PANELS

(71) Applicant: William F. Crunk, San Angelo, TX (US)

(72) Inventor: William F. Crunk, San Angelo, TX (US)

( * ) Notice: Subject to any disclaimer, the term of this patent is extended or adjusted under 35 U.S.C. 154(b) by 0 days.

(21) Appl. No.: 18/149,140

(22) Filed: Jan. 2, 2023

(65) Prior Publication Data

US 2023/0286021 A1 Sep. 14, 2023

Related U.S. Application Data

(60) Continuation of application No. 17/325,642, filed on May 20, 2021, now Pat. No. 11,541,430, which is a (Continued)

(51) Int. Cl.
*B08B 1/14* (2024.01)
*B08B 1/16* (2024.01)
(Continued)

(52) U.S. Cl.
CPC ............... *F03D 80/55* (2016.05); *B08B 1/14* (2024.01); *B08B 1/143* (2024.01); *B08B 1/16* (2024.01);
(Continued)

(58) Field of Classification Search
CPC .. B08B 1/001; B08B 3/02; B08B 3/08; B08B 13/00; B08B 7/04; B08B 3/003;
(Continued)

(56) References Cited

U.S. PATENT DOCUMENTS 3,791,330 A * 2/1974 Haddad .................. B63B 15/02
114/221 R
6,022,192 A 2/2000 DeLaHoz et al.
(Continued)

FOREIGN PATENT DOCUMENTS

CN 206948253 U 1/2018
CN 107824525 A 3/2018
(Continued)

OTHER PUBLICATIONS

Trademark PERMASOFT (Reg. No. 4371203) (Year: 2013).*
Machine translation of DE-202014105029-U1 (Year: 2014).*

*Primary Examiner* — Erin F Bergner
(74) *Attorney, Agent, or Firm* — Michael Scheinberg; Scheinberg & Associates, PC

(57) ABSTRACT

A method for cleaning a wind turbine blade or a solar panel includes applying a cleaning solution to a surface of a wind turbine blade or solar panel; affixing a wind cinch device around a high point of the wind turbine blade or solar panel; applying tension to one or more lines attached to the wind cinch device to control the pressure the wind cinch device applies to the surface of the wind turbine blade or solar panel; and pulling the wind cinch device from the high point on the wind turbine blade or solar panel to a low point on the wind turbine blade or solar panel. A wind cinch device includes a main body, the main body being an elongated member having a cleaning surface sufficient in length to form a loop around a wind turbine blade when wrapped around a wind turbine blade.

9 Claims, 13 Drawing Sheets

Related U.S. Application Data division of application No. 16/820,206, filed on Mar. 16, 2020, now Pat. No. 11,020,772, which is a continuation-in-part of application No. 16/783,154, filed on Feb. 5, 2020, now abandoned.

(60) Provisional application No. 62/801,174, filed on Feb. 5, 2019.

(51) Int. Cl.
| | | |
|---|---|---|
| *B08B 3/02* | (2006.01) | |
| *B08B 3/08* | (2006.01) | |
| *B08B 7/04* | (2006.01) | |
| *B08B 13/00* | (2006.01) | |
| *F03D 80/55* | (2016.01) | |

(52) U.S. Cl.
CPC ................. *B08B 3/02* (2013.01); *B08B 3/08* (2013.01); *B08B 7/04* (2013.01); *B08B 13/00* (2013.01)

(58) Field of Classification Search
CPC ......... B08B 1/008; B08B 1/002; B08B 1/006; B08B 1/003; B08B 1/005; B08B 1/00; F03D 80/55
See application file for complete search history.

(56) References Cited

U.S. PATENT DOCUMENTS

| | | |
|---|---|---|
| 7,521,083 B2 | 4/2009 | Teichert |
| 8,033,791 B1 | 10/2011 | Watanabe |
| 8,057,605 B2 | 11/2011 | Gallegos |
| 8,062,431 B2 | 11/2011 | Kumar et al. |
| 8,192,163 B2 | 6/2012 | Siebers et al. |
| 8,281,442 B2 | 10/2012 | Eggleston |
| 8,641,374 B2 | 2/2014 | Byreddy et al. |
| 8,806,746 B2 | 8/2014 | Pasupuleti et al. |
| 8,887,664 B2 | 11/2014 | Teichert |
| 9,488,156 B2 | 11/2016 | Rose, Jr. et al. |
| 9,638,163 B2 | 5/2017 | Holloway et al. |
| 9,885,343 B2 | 2/2018 | Palomas et al. |
| 2005/0042102 A1 | 2/2005 | Teichert |
| 2005/0286963 A1* | 12/2005 | Exum ................. B08B 3/026 401/47 |
| 2006/0096050 A1 | 5/2006 | Simonette et al. |
| 2009/0297352 A1 | 12/2009 | Walter |
| 2010/0003138 A1 | 1/2010 | Siebers et al. |
| 2011/0094549 A1 | 4/2011 | Lin |
| 2011/0127109 A1 | 6/2011 | Teichert |
| 2011/0140060 A1 | 6/2011 | Olson et al. |
| 2015/0152837 A1* | 6/2015 | Lee ................... F03D 1/0641 416/223 R |
| 2015/0207005 A1 | 7/2015 | Feng |
| 2015/0217841 A1* | 8/2015 | Mohr .................. B08B 1/002 134/6 |
| 2016/0015164 A1 | 1/2016 | Bugg |
| 2017/0002797 A1 | 1/2017 | Chen et al. |
| 2017/0063293 A1 | 3/2017 | Parrott et al. |
| 2017/0373633 A1 | 12/2017 | Evans |
| 2018/0000309 A1 | 1/2018 | Wright |
| 2018/0003656 A1 | 1/2018 | Michini et al. |
| 2018/0087490 A1 | 3/2018 | Fraughton et al. |
| 2018/0212559 A1 | 7/2018 | Meller et al. |
| 2019/0089295 A1 | 3/2019 | Qian et al. |
| 2020/0033127 A1 | 1/2020 | Tsujii et al. |

FOREIGN PATENT DOCUMENTS

| | | | |
|---|---|---|---|
| CN | 107035630 B | 3/2019 | |
| DE | 202014105029 U1 * | 12/2014 | ............. A47L 13/16 |
| WO | 2005054672 A1 | 6/2005 | |
| WO | 2007006259 A1 | 1/2007 | |
| WO | 2017059865 A2 | 4/2017 | |
| WO | 2018210632 A1 | 11/2018 | |

* cited by examiner

SYSTEM AND METHOD FOR CLEANING WIND TURBINE BLADES AND SOLAR PANELS

The present application is a continuation of U.S. patent application Ser. No. 17/325,642, filed May 20, 2021, which is a divisional of U.S. patent application Ser. No. 16/820, 206, filed Mar. 16, 2020, and issued as U.S. Pat. No. 11,020,772 on Jun. 1, 2021, which is a continuation-in-part of U.S. patent application Ser. No. 16/783,154 filed on Feb. 5, 2020, which is a nonprovisional application claiming priority from U.S. Provisional Patent Application No. 62/801,174 filed on Feb. 5, 2019, all of which are hereby incorporated by reference.

TECHNICAL FIELD OF THE INVENTION

The present invention relates generally to systems and methods for cleaning wind turbine blades and solar panels.

BACKGROUND OF THE INVENTION

Wind Energy is a fast-growing industry. Wind turbines are used to convert the kinetic energy of the wind into electrical energy. FIG. 1 is a diagram of a prior art wind turbine 100. Wind turbine 100 includes tower 102 and rotor 104. Rotor 104 includes a plurality of wind turbine blades 106a-c. While three wind turbine blades 106a-c are shown in FIG. 1 for purposes of demonstration, wind turbine 100 can include any number of wind turbine blades. The kinetic energy of the wind against blades 106a-c causes rotor 104 to rotate. Rotor 104 is connected to a generator that generates electricity by converting the kinetic energy of rotor 140 into electrical energy.

Wind turbines are expensive to build, so they need proper maintenance to prolong service life. Since blades are the most important component in the wind turbine, proper cleaning, maintenance and inspections of the blades is a necessary, but difficult, process.

After a wind turbine is built and in service, the concern now becomes how to optimize and get the most out of wind energy. Experts estimate the designed life of a wind turbine is about 20 years. This does not mean that all parts will fail at the tick mark of 20 years; many parts will still be functioning for years after. Maintenance can be scheduled well ahead of time and has a very predictable cost over the life of the turbine, especially the blades.

Studies indicate that on average a wind turbine blade should be cleaned every 5 to 7 years to achieve maximum performance. Insects, birds, bats, oil contamination, pollution, sand—everything that blows in the wind—reduces the maximum potential of the blades. Current blade cleaning methods can take 12 hours to 3 days to complete, requires a crew of 6 to 8 people, and requires complete shutdown of machinery.

The National Aeronautics and Space Administration (NASA) uses a cleaning technology called Zi-400, the same thing they used to clean the Space Shuttle. Another technology is called Windwash 6000, along with a 3500 pounds per square inch (psi) heated water pressure washer. Both products/technologies are colloidal cleaners that prevent corrosion. Both are biodegradable and highly ecological. Peat Plus is also a technology used in containment of the hydrocarbons. Peat Plus is approved by the Environmental Protection Agency (EPA) as well as the United States Coast Guard. It also saves time during the washing process.

Current methods of cleaning wind turbine blades include using helicopters and/or trained professionals climb up with ladders and ropes to gain safe access to exterior of tower, control room and the turbine blades. A tech with a high-powered water pressure washer, after being secured in a skylift or "cherry picker", sprays both sides of one blade at a time, and rappelers on ropes, rappel down the blades and wipe down the blades by hand with rags while swinging across, side-to-side of the blade, all the way down a 300 foot turbine blade.

Exhausting and a liability nightmare, these are currently the best options and choices the industry has.

Another renewable energy source that requires periodic cleaning to maintain its operating efficiency are solar panels. Solar panels convert solar radiation incident upon the surface of the solar cells within the solar panels into electrical energy. Contamination of the surface of a solar panel directed toward the sun attenuates the solar radiation received by the solar cells and reduces the electricity that is generated by the solar panel. Solar panels, especially large solar panel arrays for commercial power generation, are often location in arid locations to help maximize the solar irradiation of the solar panel array. Arid climates often lead to an increased amount of airborne dust and other contaminants that build up on the solar panels.

Solar panels are often installed in high places such as the roofs of homes, buildings, garages, or on towers that can rotate and track the sun. Installation in high places, among other things, helps to avoid shadows being cast across the panels and to avoid potential impacts that could break the panels. However, installation in high places makes periodic cleaning more difficult.

SUMMARY OF THE INVENTION

Embodiments of the present invention are directed to a method for cleaning a wind turbine blade with a wind cinch device. The method includes applying a cleaning solution to a surface of a wind turbine blade; affixing a wind cinch device around a high point of the wind turbine blade; applying tension to one or more lines attached to the wind cinch device to control the pressure the wind cinch device applies to the surface of the wind turbine blade; and applying tension to the one or more lines attached to the wind cinch device to pull the wind cinch device from the high point on the wind turbine blade to a low point on the wind turbine blade.

Other embodiments of the present invention are directed to a method for cleaning a solar panel with a wind cinch device. The method includes applying a cleaning solution to a surface of a solar panel; placing a wind cinch device on a high point of the surface of the solar panel; applying tension to one or more lines attached to the wind cinch device to control the pressure the wind cinch device applies to the surface of the solar panel; and applying tension to the one or more lines attached to the wind cinch device to pull the wind cinch device from the high point on the solar panel to a low point on the solar panel.

Other embodiments of the present invention are directed to a Wind Cinch device. The Wind Cinch device includes a main body, the main body being an elongated member having a cleaning surface sufficient in length to form a loop around a wind turbine blade when wrapped around a wind turbine blade. The Wind Cinch device also includes a plurality of rigging points, each rigging point adapted to receive a line. Applying tension to one or more of the lines attached to the rigging points changes the circumference of the loop formed by wrapping the wind cinch device around the wind turbine blade.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF THE INVENTION

Embodiments of the present invention are directed to a method and system for cleaning wind turbine blades utilizing a "Wind Cinch" device described herein. Other embodiments of the present invention are directed to a method and system for cleaning solar panels utilizing the Wind Cinch device. Embodiments of the Wind Cinch are similar in design to a "horse cinch," "saddle cinch," or "girth" used to fasten a Western saddle to a horse and keep the saddle in place. The Wind Cinch device is much larger in size than a horse cinch and is made from different materials. The Wind Cinch device is made of materials suitable for cleaning the blades of wind turbines. In at least one embodiment, the Wind Cinch is made of industrial strength car wash materials that stretch and flex and are designed to soak up water thoroughly, meticulously, and rapidly.

With this relatively simple method and use of the Wind Cinch apparatus, the cleaning of wind turbine blades can be utilized locally, regionally, statewide and around the globe, all the while adding speed and accuracy—and alleviating the dangers, liabilities, farcical and ludicrous methods—without setting a foot on the fragile fiberglass.

In addition to being a new, superior, fast, and proficient system and method of cleaning wind turbine blades, the "Wind Cinch" can be made in the same shape and fashion that a horse cinch from the above-mentioned car wash products. After a technician skilled in the art of high pressure water hose (first with said cleaners) has prepared and washed the wind turbine blade, he then attaches to the top of a wind turbine blade from a tall crane or cherry picker designed for the procedure, attaches the said "Wind Cinch" to the top of the blade, where a tech, secured to the top structure of turbine, allows technicians on the ground, via ropes to said cinch, and pulls and directs the cinch to "squeegee" the water off the blade, the force being provided by inertia and gravity.

Figure 1:
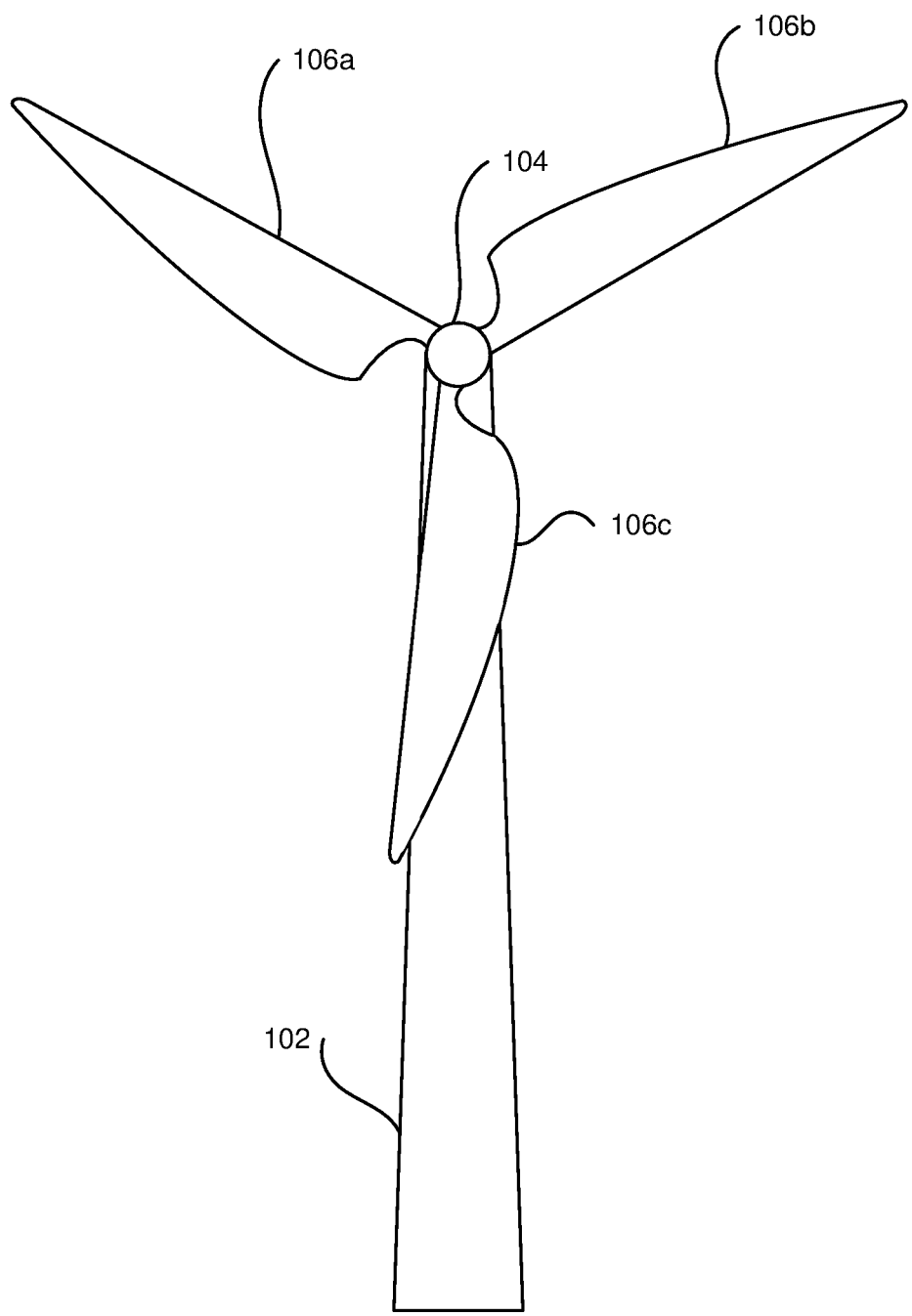
FIG. 1 is a diagram of a prior art wind turbine.
Figure 2:
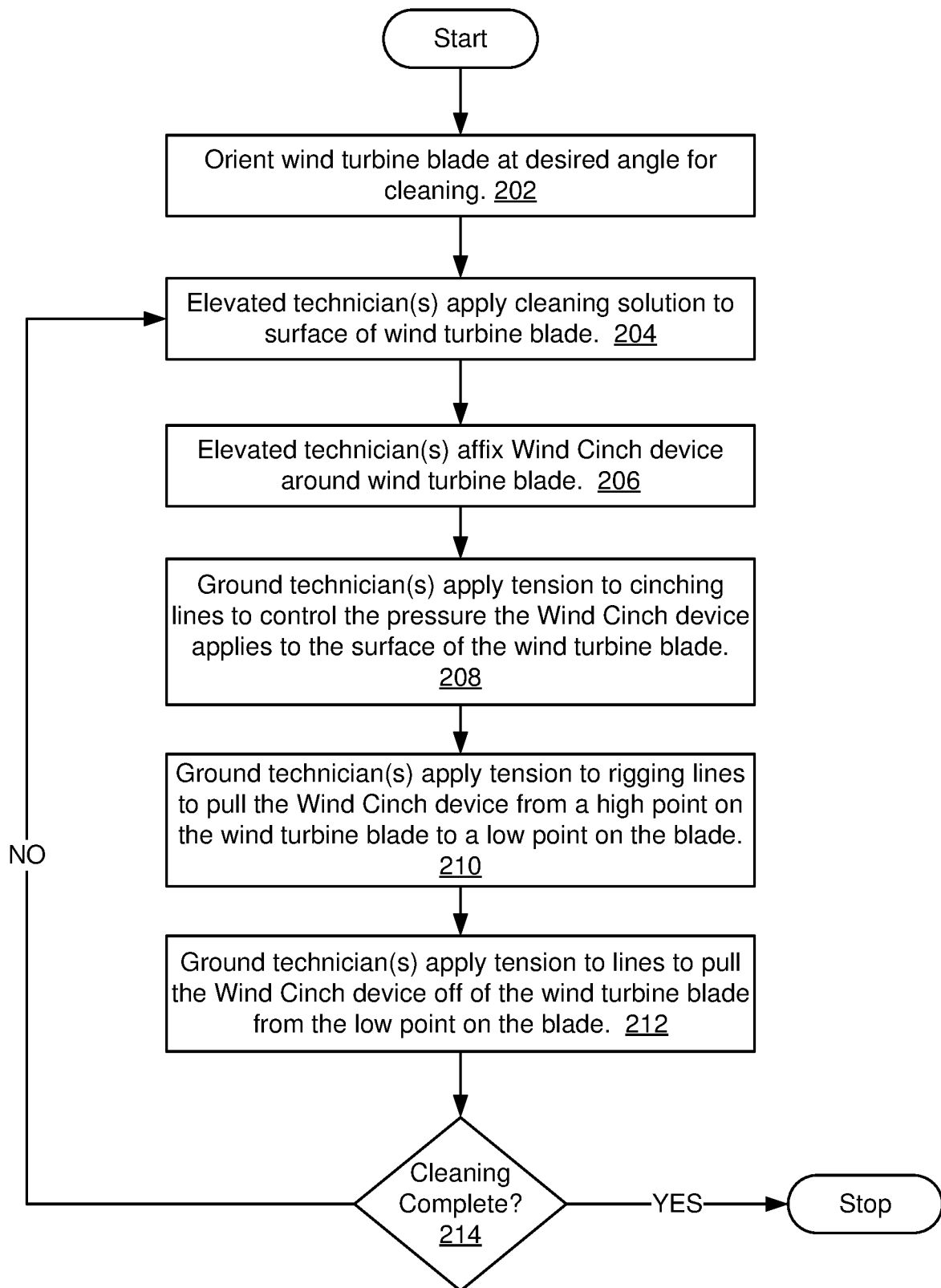
FIG. 2 is a flowchart showing an exemplary method of cleaning a wind turbine blade using a Wind Cinch device.

FIG. 2 is a flowchart showing an exemplary method of cleaning a wind turbine blade using a Wind Cinch device. At step 202, the wind turbine blade is oriented at the desired angle for cleaning. In a preferred embodiment, the wind turbine blade that is to be cleaned is locked at 40-45 degrees to assure that the apparatus can be easily drawn downward by gravitational force, while cinch is tightened or loosened accordingly for maximum drying.

At step 204, one or more elevated technicians apply cleaning solution to the surface of the wind turbine blade that is to be cleaned. Elevated technicians are technicians that are elevated above ground level to perform certain tasks on the wind turbine blade, such as applying cleaning solution and affixing the Wind Cinch device around a wind turbine blade. Any known means for safely elevating a technician above ground level to work on a wind turbine blade can be used. To make practical and utilize by preference, one or two sky lifts, each occupied by a trained technician, equipped with water pressure washers preferably heated and pressurized to 3500 psi commence to spray down each side and edge of said wind turbine blade with an EPA-approved, colloidal, biodegradable and ecological solution that can prevent corrosion, and improve performance.

Figure 3:
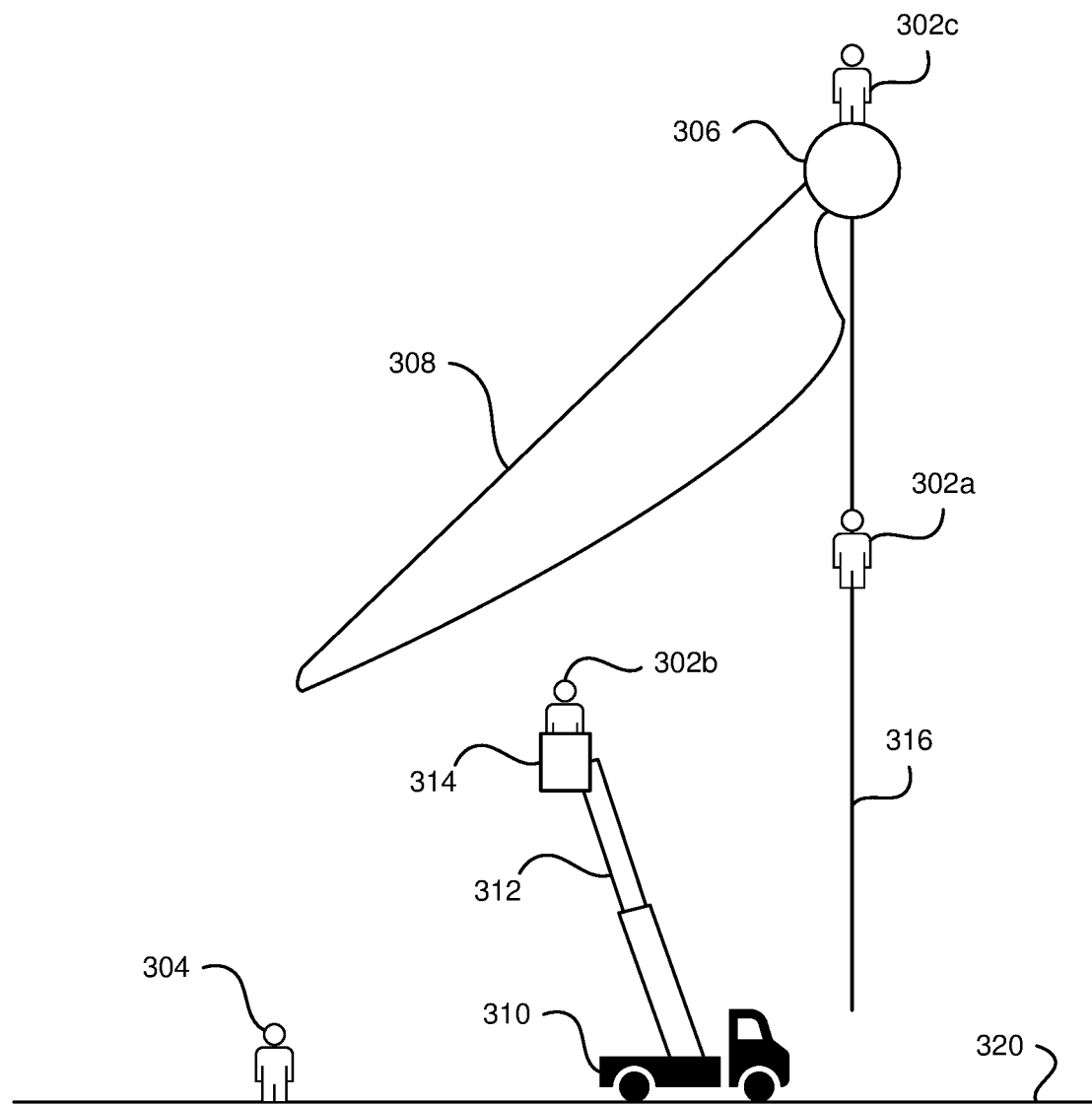
FIG. 3 is a diagram showing exemplary positioning of technician(s) for cleaning a wind turbine blade with a Wind Cinch device.

FIG. 3 is a diagram showing exemplary positioning of technician(s) for cleaning a wind turbine blade with a Wind Cinch device. Elevated technicians 302a-c are elevated above ground level 320. Elevated technician 302a uses line 316 to rappel down from wind turbine rotor 306 after climbing up the tower of the wind turbine (not shown). Elevated technician 302b is elevated above ground level by way of skylift 312 in skylift bucket 314. Skylift 312 can be attached to truck 310. Elevated technician 302c is located at the top of the tower to hoist items up and assist in the rigging of the Wind Cinch device to the wind turbine blade. Being elevated above ground level 320 places elevated technicians 302a-b in a position to perform certain tasks on wind turbine blade 308, such as applying cleaning solution and affixing the Wind Cinch device around a wind turbine blade. Ground technician 304 is located at ground level to perform tasks that cannot be performed from an elevated position.

Turning back to FIG. 2, after cleaning solution is applied to the wind turbine blade at step 202, one or more elevated technicians affix the Wind Cinch device around the wind turbine blade that is to be cleaned (step 206). In at least one embodiment, the Wind Cinch device is easily applied by, for example, two elevated technicians in the sky lifts and another elevated technician on top of the turbine (via a rope). The cleaning solution can be allowed to dry before the Wind Cinch device is affixed around the wind turbine blade, or the Wind Cinch device can be affixed around the wind turbine blade before the cleaning solution dries.

Figure 4:
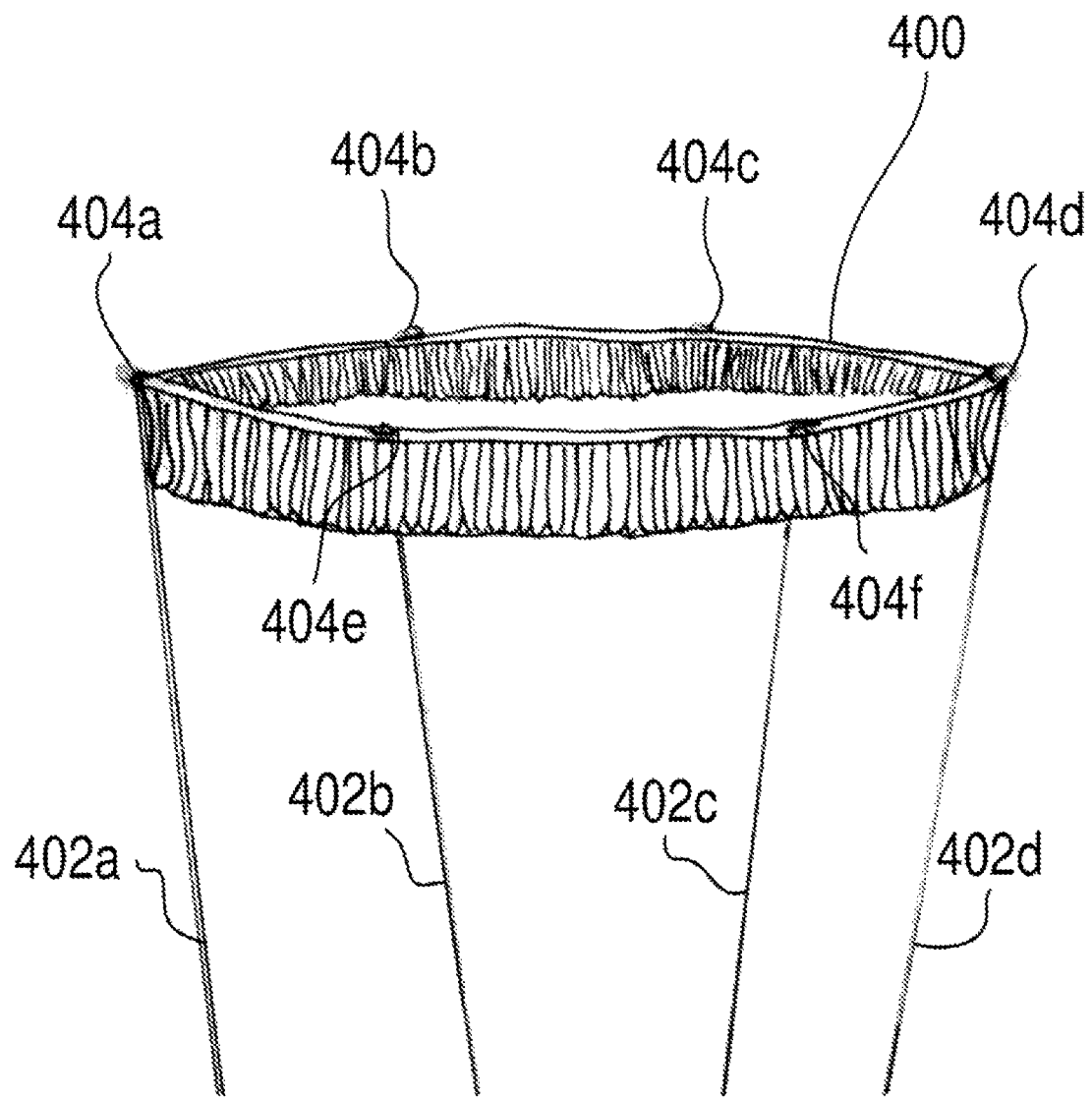
FIG. 4 is a diagram showing a Wind Cinch device positioned around a wind turbine blade for cleaning in accordance with an exemplary embodiment of the present invention.

FIG. 4 shows a Wind Cinch device 400 ready for use on a wind turbine blade (not shown). Wind Cinch device 400 is closed to form a loop that can wrap around and conform to the shape of the wind turbine blade. Lines, ropes, cables, etc. (hereinafter, "lines") 402a-d are rigged to rigging points 404a-f of Wind Cinch device 400. One or more of lines 402a-d can be used to apply downward force on Wind Cinch device 400 so that Wind Cinch device 400 is pulled along the face of wind turbine blade toward technicians on the ground. One or more of lines 402a-d is preferably used by ground technicians to expand or reduce the circumference of the loop made by Wind Cinch device 400, thereby enabling Wind Cinch device 400 to conform to the shape of the wind turbine blade as the Wind Cinch progresses down the long axis of the wind turbine blade. Ground technicians and/or elevated technicians can also expand or reduce the circumference of the loop made by Wind Cinch device 400 to increase or decrease the pressure applied by the cleaning surface of Wind Cinch device 400 to surface of the wind turbine blade. That is, ground technicians can use the tension in the lines to apply pressure to the wind turbine surface so that Wind Cinch 400 "squeegees" the wind turbine surface. This process is described in further detail with respect to FIG. 2.

The method can also include an additional step of inspecting the wind turbine blade for damage. The inspection step can include having an elevated technician take photos and/or videos of the surface of the wind turbine blade, particularly of any areas that show damage. The elevated technician can determine the location of the damage using a measuring device such as a laser tape or other laser measuring device. In one embodiment, the elevated technician performs the inspection as the Wind Cinch device is being pulled down the surface of the wind turbine blade. If the elevated technician discovers damage, the technician can radio down to the ground technicians to stop pulling the Wind Cinch device downward to allow for further inspection, measurement, and photos/videos to be taken.

The method can also include an additional step of apply a sealant to the surface of the wind turbine blade after the wind turbine blade is clean. The sealant helps the wind turbine blade to resist future contamination, thereby increasing the time interval needed between cleanings. The sealant can be applied with the pressure washer, for example, in a misting application. A Wind Cinch device can be used to spread sealant evenly on the surface of the wind turbine blade. A disposable Wind Cinch device can be used to spread the sealant.

At step 208, ground technicians apply tension to one or more lines to control the pressure that the Wind Cinch device applied to the surface of the wind turbine blade. At step 210, ground technicians apply tension to one or more lines to pull the Wind Cinch device from a high point on the wind turbine blade (i.e., farther from ground level) to a low point on the wind turbine blade (i.e., closer to ground level), thereby cleaning the surface of the wind turbine blade. Ground technicians can apply tension by way of human action pulling on the lines. Ground technicians can apply tension through mechanical means such as using a winch or moving a vehicle to which the lines are attached. Elevated technicians can also apply tension to lines, for example, to counteract the tension pulling the Wind Cinch device to a lower point on the wind turbine blade, thereby regulating the speed with which the Wind Cinch device moves across the surface of the wind turbine blade. At step 212, when the Wind Cinch device has reached a low point on the wind turbine blade, ground technicians apply tension to the lines to pull the Wind Cinch device off the wind turbine blade. At step 214, if cleaning is complete then the process ends. At step 214, if cleaning is complete then the process ends. At step 214, if cleaning is not complete then the process can return to step 204 where more cleaning solution is applied to the wind turbine blade, and the remaining steps are repeated as needed.

Figure 5:
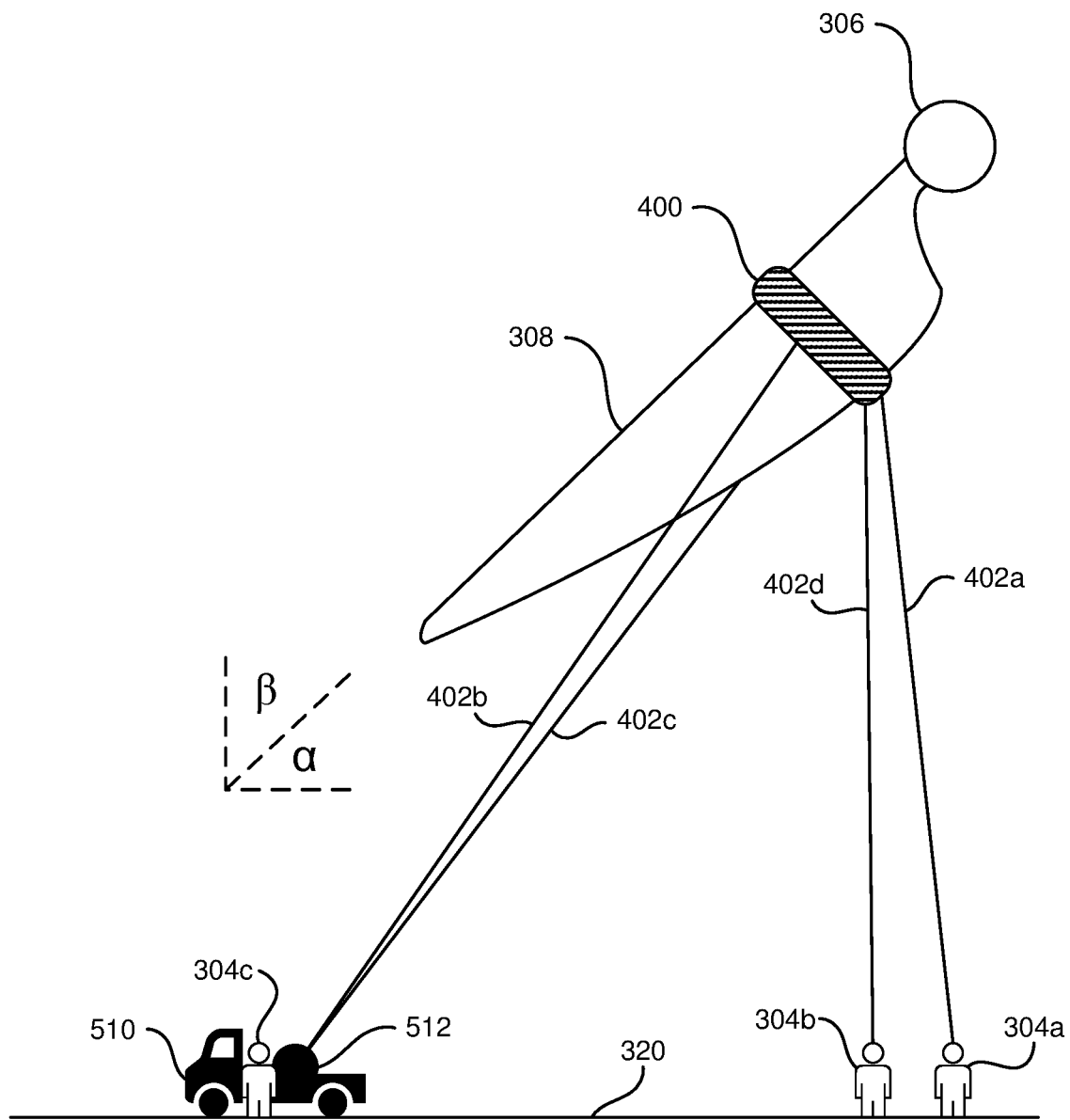
FIG. 5 is diagram showing a Wind Cinch device 400 positioned around wind turbine blade 308 for cleaning in accordance with an exemplary embodiment of the present invention.

FIG. 5 is diagram showing a Wind Cinch device 400 positioned around wind turbine blade 308 for cleaning in accordance with an exemplary embodiment of the present invention. Lines 402a-d are connected to Wind Cinch device 400. Ground technicians 304a-c can use lines 402a-d to perform steps 208, 210, and 212. For example, ground technicians 304a and 304b can pull on lines 402a and 402d to control the circumference of the loop formed by Wind Cinch device 400, thereby controlling the pressure Wind Cinch device 400 applies to the surface of wind turbine blade 308, as described in step 208. It is especially important to control the pressure against the leading edge of the wind turbine blade because cleaning the leading edge of the wind turbine blade has the largest effect on improving the efficiency of the wind turbine. Ground technician 304c can use lines 402b and 402c to pull the Wind Cinch device 400 from a high point on wind turbine blade 308 (i.e., farther from ground level 320) to a low point on wind turbine blade 308 (i.e., closer to ground level), thereby cleaning the surface of wind turbine blade 308 as described in step 210. Ground technician 304c can use lines 402b and 402c to pull the Wind Cinch device off the wind turbine blade as described in step 212.

Lines 402b and 402c can be connected to winch 512. Winch 512 can be connected to truck 510. Ground technician 304c can use winch 512 to apply tension to lines 402b and 402c. Alternatively, lines 402a and 402b can be connected to truck 510 without a winch, and truck 512 can be driven forward or backward as needed to apply tension to lines 402a and 402b. Two or three ground technicians located on the ground pull or winch the ropes that are strategically attached to the Wind Cinch, until desired cleaning is complete.

Figure 6:
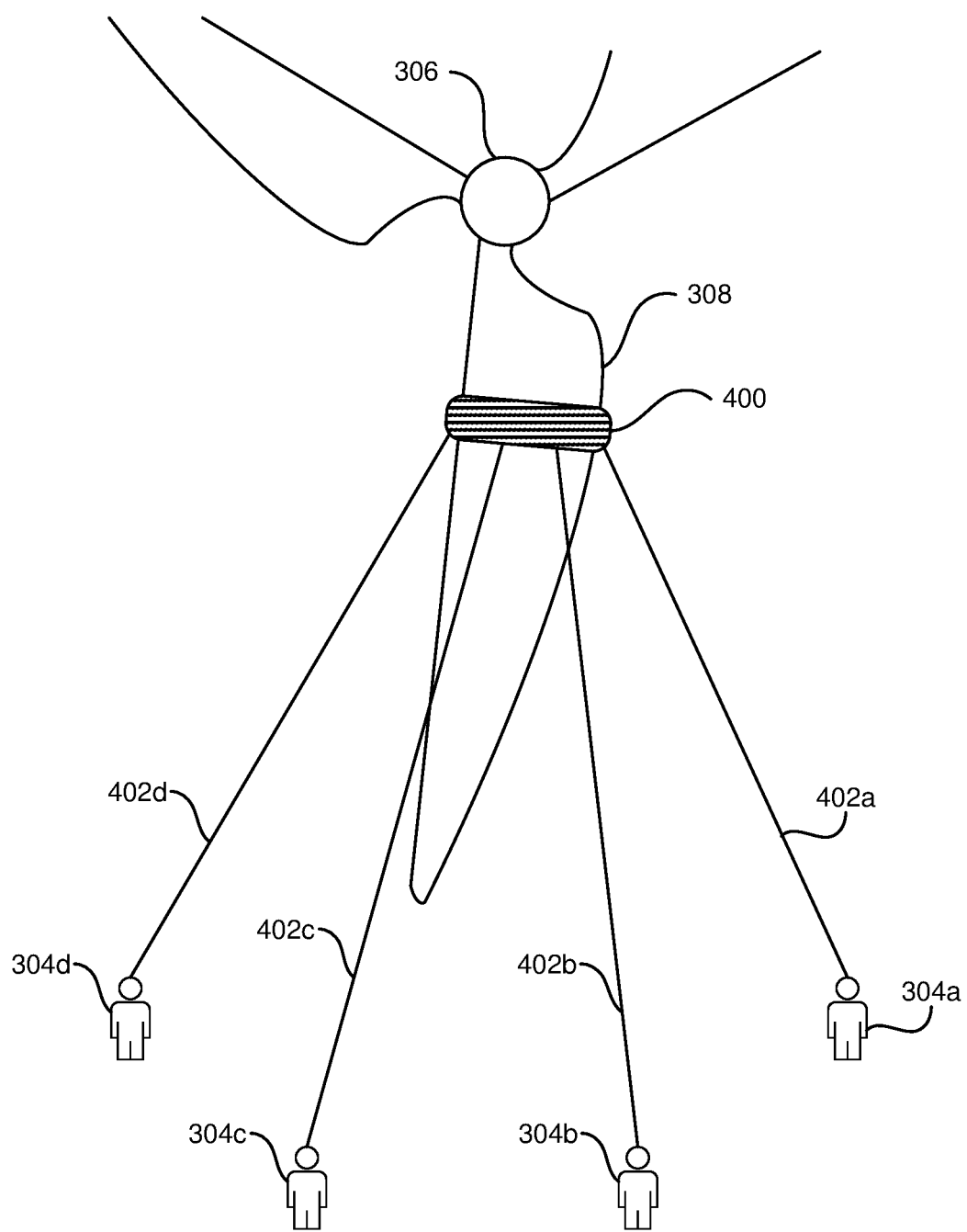
FIG. 6 shows a Wind Cinch device ready for use on a wind turbine blade (not shown)

In one embodiment, wind turbine blade 308 is oriented so that the angle of the major axis of wind turbine blade 308 with respect to the vertical direction (angle $\beta$) is in the range of 40-45 degrees to assure that the apparatus can be easily drawn downward by gravitational force, while cinch is tightened or loosened accordingly for maximum drying. In another embodiment, wind turbine blade 308 is oriented so that the angle of the major axis of wind turbine blade 308 with respect to the horizontal direction (angle $\alpha$) is in the range of 40-45 degrees. FIG. 6 is a diagram showing an alternative orientation of wind turbine blade 308 and an alternative arrangement of ground technicians 304a-d. While the drawings of the present application may show a particular number of technicians, any number of technicians can be used to perform the method according to the requirement of the job. Furthermore, one technician can perform the tasks of both an elevated technician and a ground technician by changing his position to a position elevated above or lowered to ground level. In some embodiments, only one technician is needed to perform the method shown in FIG. 2. Additionally, any means of applying tension on the lines is within the scope of the present invention. For example, human ground technicians can pull on the lines. The lines can be connected to a vehicle, such as a utility truck used by the technicians, and the vehicle can be slowly driven forward or backward to put tension on the lines. The utility truck can include a winch that is used to put tension on the lines. Or any combination thereof.

FIGS. 7-11 show several exemplary embodiments of Wind Cinch devices. Each of the Wind Cinch devices includes a cleaning surface and a plurality of rigging points, such as rings, adapted to receive and fasten thereto lines, cords, ropes, cables and the like (hereinafter "lines"). The Wind Cinch is designed to be harnessed around to the top of a wind turbine blade and easily adjusted to slide down the wet blade and "squeegee" the water, cleaning solution, and/or contaminants from the surface of the wind turbine blade.

Figure 7:
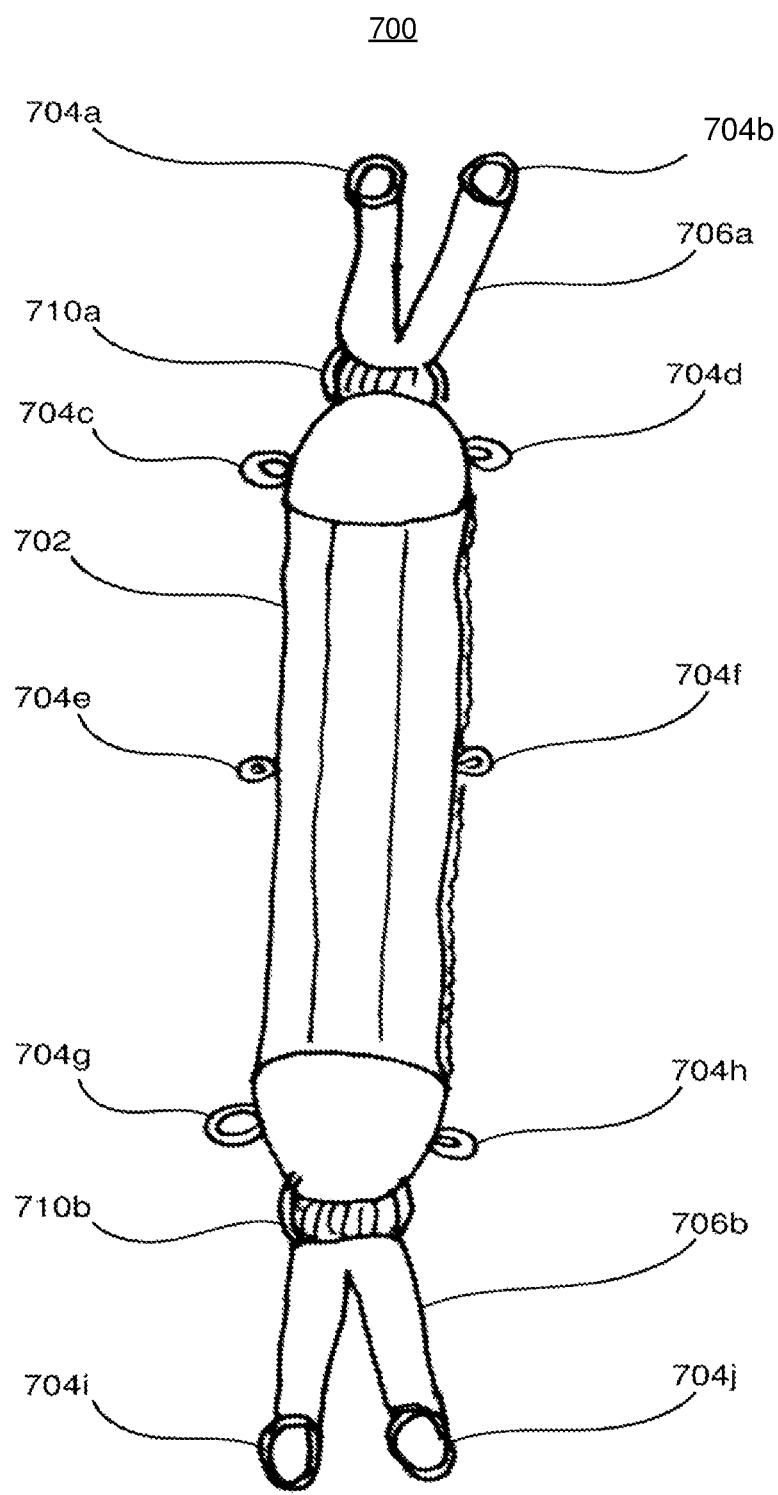
FIG. 7 shows an exemplary embodiment of a Wind Cinch device.

FIG. 7 shows an exemplary embodiment of a Wind Cinch device. Wind Cinch device 700 includes main body 702. Main body 702 includes the primary cleaning surface of Wind Cinch device 700. Main body 702 is made of materials suitable for cleaning the blades of wind turbines. In at least one embodiment, main body 702 of Wind Cinch 700 is made of industrial strength car wash materials that stretch and flex and are designed to soak up water thoroughly, meticulously, and rapidly. Main body 702 is an elongated member having a cleaning surface sufficient in length to wrap around a wind turbine blade. Main body 702 includes a plurality of rigging points 704a-j. While ten rigging points are shown in FIG. 7 for purposes of demonstration, main body 702 can include more or fewer rigging points as needed. Rigging points 704c-h can comprise heavy duty rings securely fastened to main body 702. Rigging points 704a-b and 704i-j can comprise heavy duty rings securely fastened to end straps 706a-b. End straps 706a-b can be connected to main body 702 by connectors 710a-b. Connectors 710a-b can comprise an elastic material that helps keeps main body 702 pressed against the surface main body 702 is cleaning when tension is applied to end straps 706a-b.

Rigging points 704a-j can be used to attach lines (e.g. cords, ropes, cables and the like) to Wind Cinch device 700 as described above. Some of the lines can be used to control the circumference of the loop formed by Wind Cinch device 700, thereby controlling the pressure Wind Cinch device 700 applies to the surface of a wind turbine blade, as described in step 208. Some of the lines can be used to pull the Wind Cinch device 700 from a high point on wind turbine blade (i.e., farther from ground level) to a low point on wind turbine blade (i.e., closer to ground level), thereby cleaning the surface of wind turbine blade as described in step 210. Some of the lines can be used to pull Wind Cinch device 700 off the wind turbine blade as described in step 212.

Figure 8:
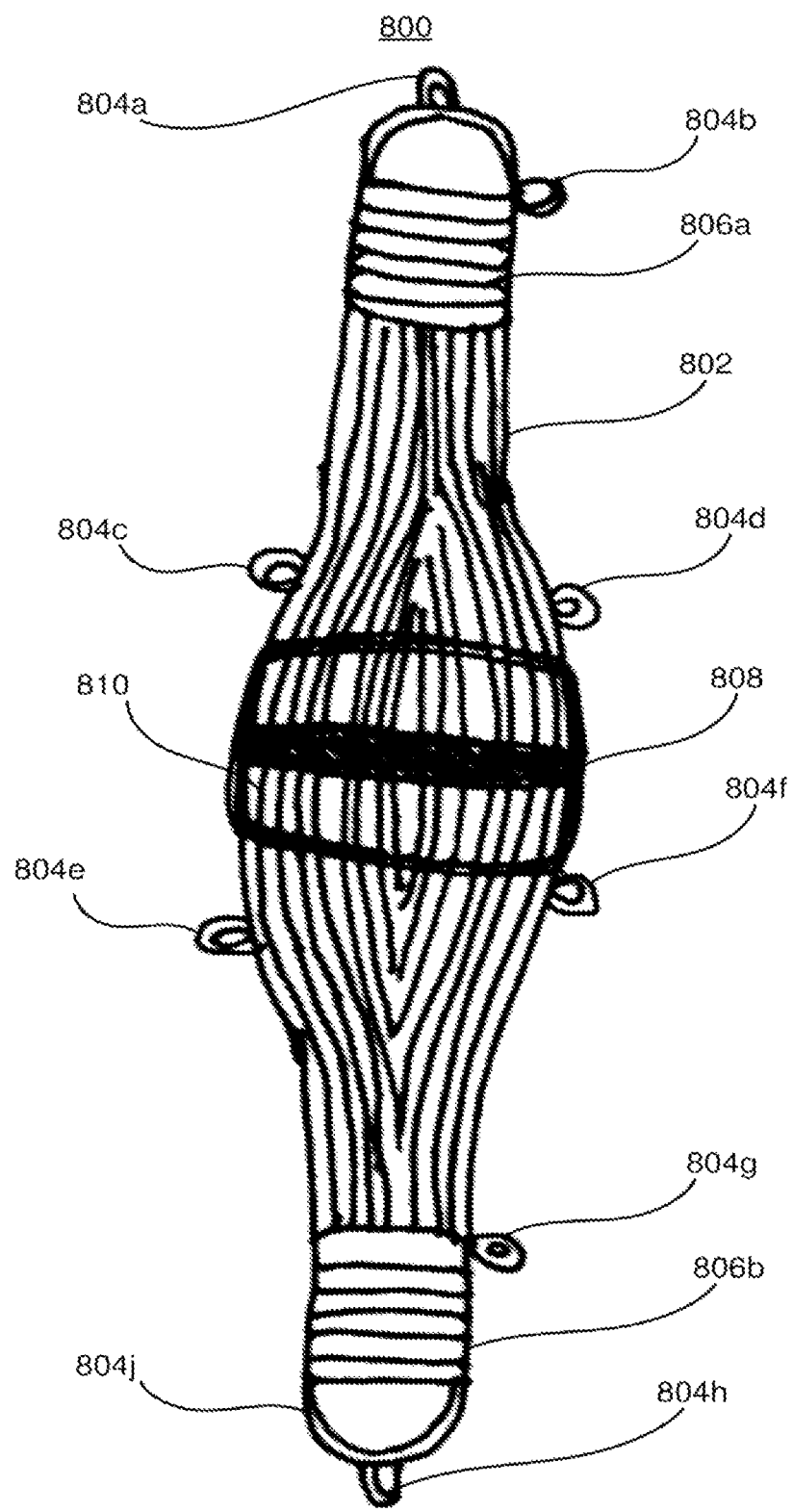
FIG. 8 shows an alternative embodiment of a Wind Cinch device.

FIG. 8 shows an alternative embodiment of a Wind Cinch device. Wind Cinch device 800 includes main body 802. Main body 802 includes the primary cleaning surface of Wind Cinch device 800. Main body 802 is made of materials suitable for cleaning the blades of wind turbines. In at least one embodiment, main body 802 of Wind Cinch 800 is made of industrial strength car wash materials that stretch and flex and are designed to soak up water thoroughly, meticulously, and rapidly. Main body 802 can be made of stranded industrial strength car wash materials. The strands can be held together by reinforcing member 808. The strands can flare out in region 810 to provide a larger cleaning surface. The strands can taper down into end straps 806a-b for strength and to provide more manageable rigging points at the ends of Wind Cinch device 800.

Main body 802 includes a plurality of rigging points 804a-j. While ten rigging points are shown in FIG. 8 for purposes of demonstration, main body 802 can include more or fewer rigging points as needed. Rigging points 804c-f can comprise heavy duty rings securely fastened to main body 802. Rigging points 804a-b and 804g-j can comprise heavy duty rings securely fastened to end straps 806a-b. Rigging points 804i-j can have the shape of a D-ring or a buckle to provide a location for connecting end straps 806a-b.

Rigging points 804a-j can be used to attach lines (e.g. cords, ropes, cables and the like) to Wind Cinch device 800 as described above. Some of the lines can be used to control the circumference of the loop formed by Wind Cinch device 800, thereby controlling the pressure Wind Cinch device 800 applies to the surface of a wind turbine blade, as described in step 208. Some of the lines can be used to pull the Wind Cinch device 800 from a high point on wind turbine blade (i.e., farther from ground level) to a low point on wind turbine blade (i.e., closer to ground level), thereby cleaning the surface of wind turbine blade as described in step 210. Some of the lines can be used to pull Wind Cinch device 800 off the wind turbine blade as described in step 212.

Figure 9:
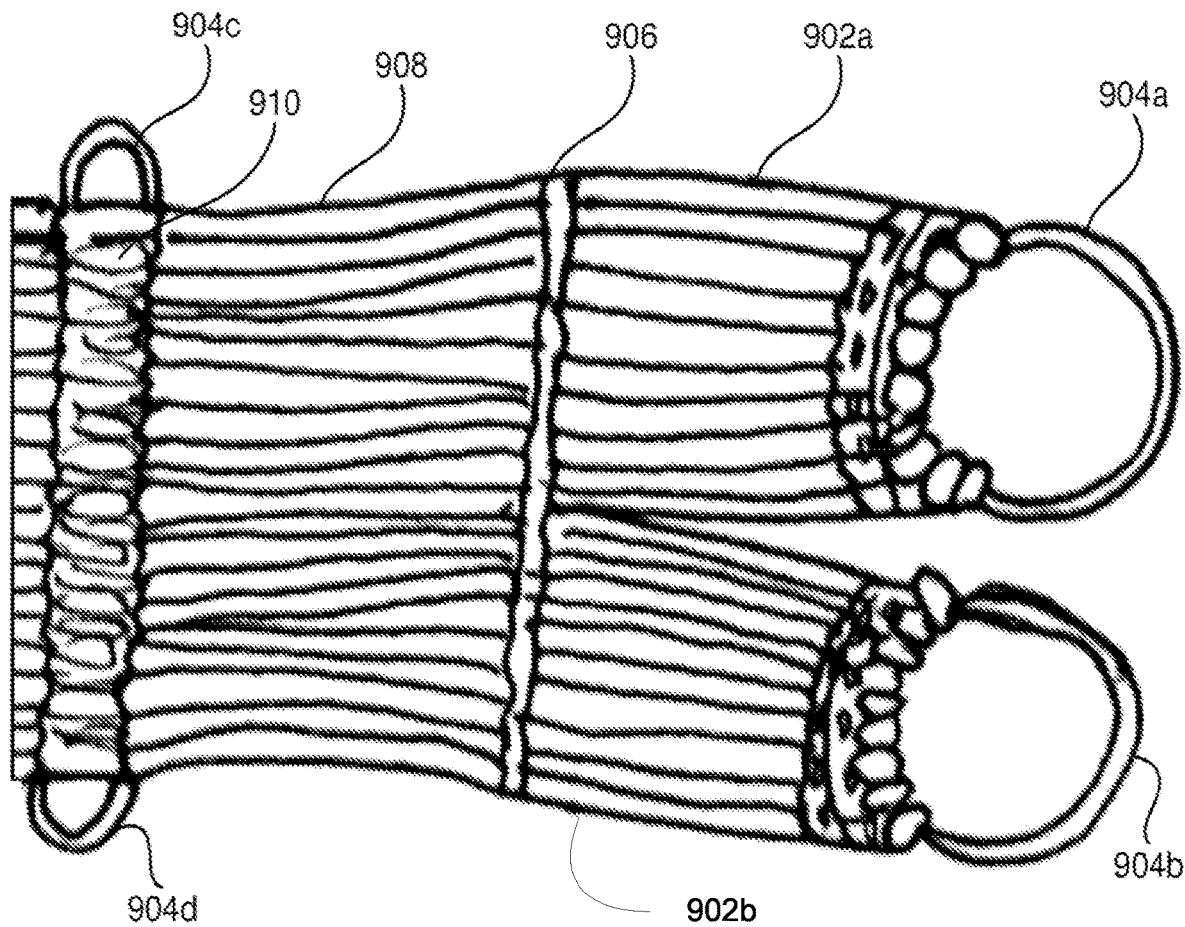
FIG. 9 shows an alternative end strap configuration for a Wind Cinch device.

FIG. 9 shows an alternative end strap configuration for a Wind Cinch device. Instead of tapering into a single end strap at each end, the strands of main body 802 of Wind Cinch device 800 can form two end straps 902a-b at each end. The strands of end strap 902a can be connected to the ring of rigging point 904a. The strands of end strap 902b can be connected to the ring of rigging point 904b. Reinforcing member 906 can provide a union for the individual strands to keep the strands of main body 802 from excessively separating. Reinforcing member 910 can also provide a union for the individual strands to keep the strands of main body 802 from excessively separating, as well as providing a sturdy attachment location for rigging points 904c-d.

Figure 10:
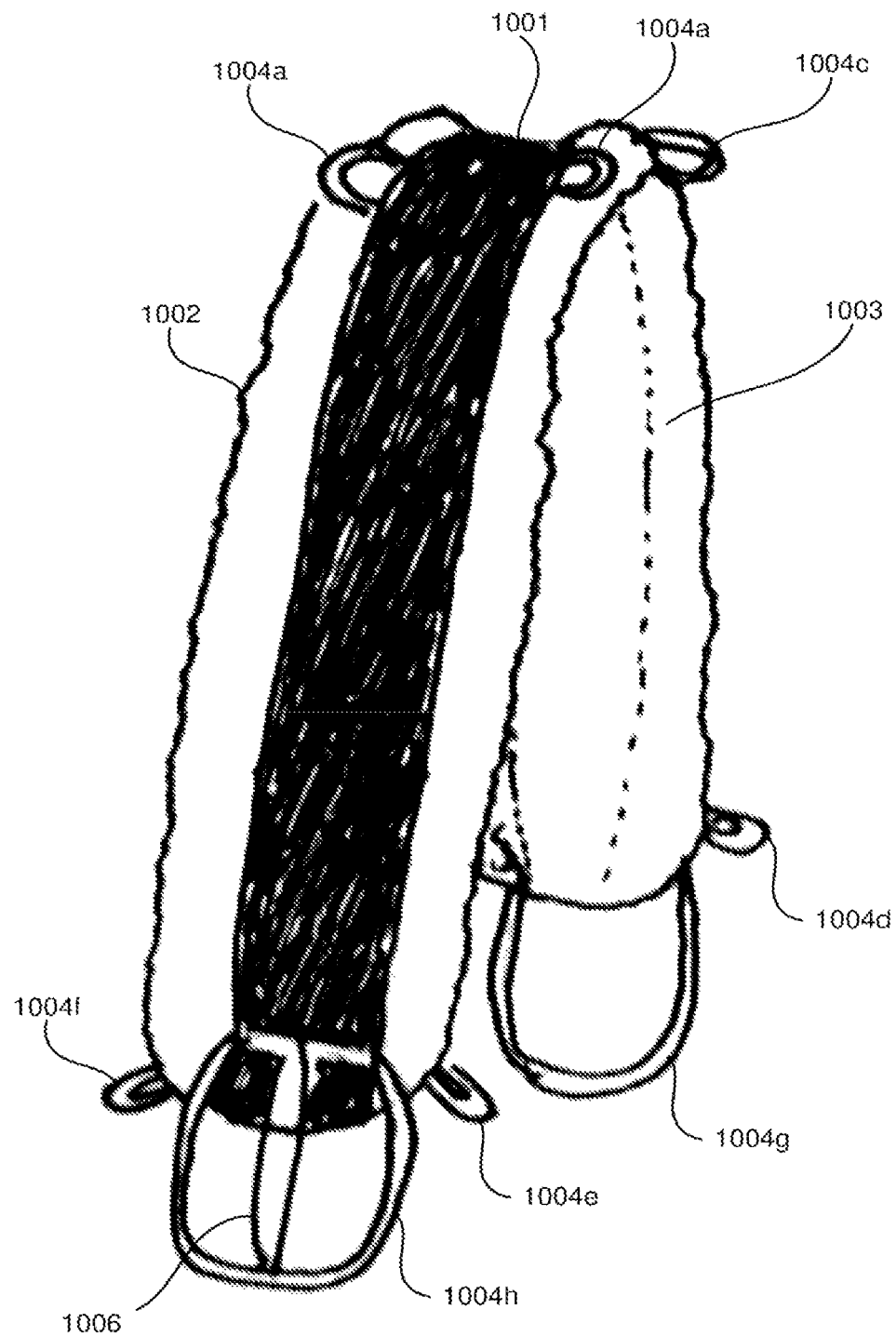
FIG. 10 shows an alternative embodiment of a Wind Cinch device.

FIG. 10 shows an alternative embodiment of a Wind Cinch device. Wind Cinch device 1000 includes main body 1002. Main body 1002 is made of materials suitable for cleaning the blades of wind turbines. In at least one embodiment, main body 702 of Wind Cinch 700 is made of industrial strength car wash materials that stretch and flex and are designed to soak up water thoroughly, meticulously, and rapidly. Main body 1002 includes primary strap 1001 and cleaning material 1003. Cleaning material 1003 is the surface that comes into contact with the wind turbine blade to clean the blade. Cleaning material 1003 is attached to primary strap 1001 to form main body 1002. Primary strap can comprise a ruggedized material that is more suited than cleaning material 1003 to withstand the tension placed on Wind Cinch device 1000 by the rigging lines.

Main body 1002 includes a plurality of rigging points 1004a-h. While eight rigging points are shown in FIG. 10 for purposes of demonstration, main body 1002 can include more or fewer rigging points as needed. Rigging points 1004a-c and 1004g-h can comprise heavy duty rings securely fastened to primary strap 1001. Rigging points 704d-f can comprise heavy duty rings securely fastened to cleaning material 1003. Rigging points 1004g-f can have the shape of a D-ring or a buckle 1006.

Rigging points 104a-j can be used to attach lines (e.g. cords, ropes, cables and the like) to Wind Cinch device 1000 as described above. Some of the lines can be used to control the circumference of the loop formed by Wind Cinch device 1000, thereby controlling the pressure Wind Cinch device 1000 applies to the surface of a wind turbine blade, as described in step 208. Some of the lines can be used to pull the Wind Cinch device 1000 from a high point on wind turbine blade (i.e., farther from ground level) to a low point on wind turbine blade (i.e., closer to ground level), thereby cleaning the surface of wind turbine blade as described in step 1010. Some of the lines can be used to pull Wind Cinch device 1000 off the wind turbine blade as described in step 212.

Figure 11:
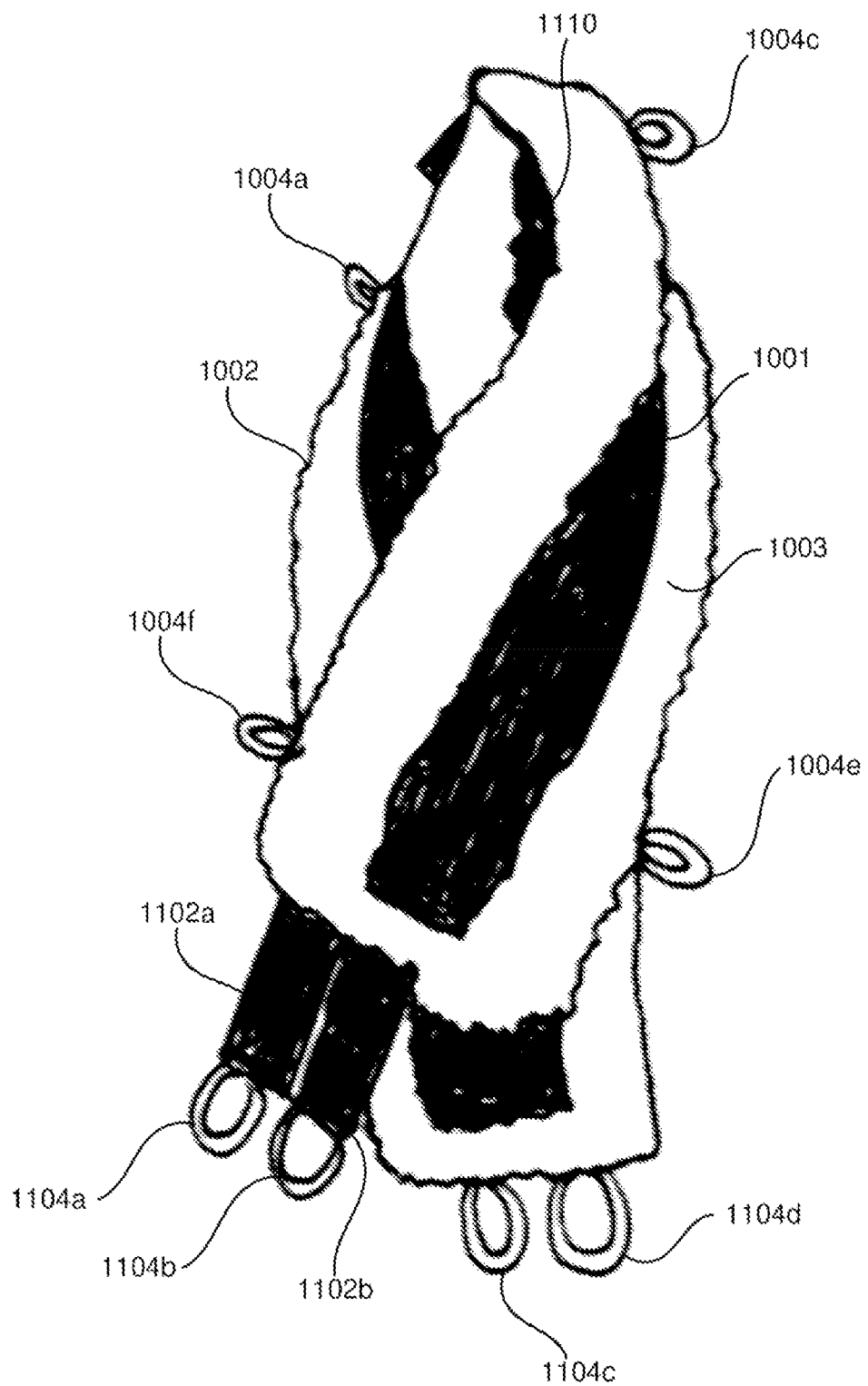
FIG. 11 shows an alternative embodiment of a Wind Cinch device.

FIG. 11 shows an alternative end strap configuration for a Wind Cinch device. Wind Cinch device 1000, instead of a having one rigging point 1004g-h at each end of the primary strap 1001, primary strap 1001 extends beneath cleaning material 1003 and separates into two end straps 1102a-b. Rigging points 1104a-b are connected to end straps 1102a-b. Similarly, at the other end of primary strap 1001, primary strap 1001 extends beneath cleaning material 1003 and separates into two end straps (not shown). Rigging points 1104c-d are connected to those end straps.

Wind Cinch device 1000 can be wrapped around itself as shown in FIG. 11, thereby creating opening 1110 where main body 1002 overlaps itself. Wind Cinch device 1000 can be placed around a wind turbine blade so that the wind turbine blade passes through opening 1110. Tension on the primary strap 1001 presses cleaning material against the wind turbine blade to provide pressure for cleaning the surface of the wind turbine blade.

Much safer, faster, efficient, and less liable for accidents than the other options for blade cleaning, the Wind Cinch is certain to prove itself in probability and possibility.

Figure 12:
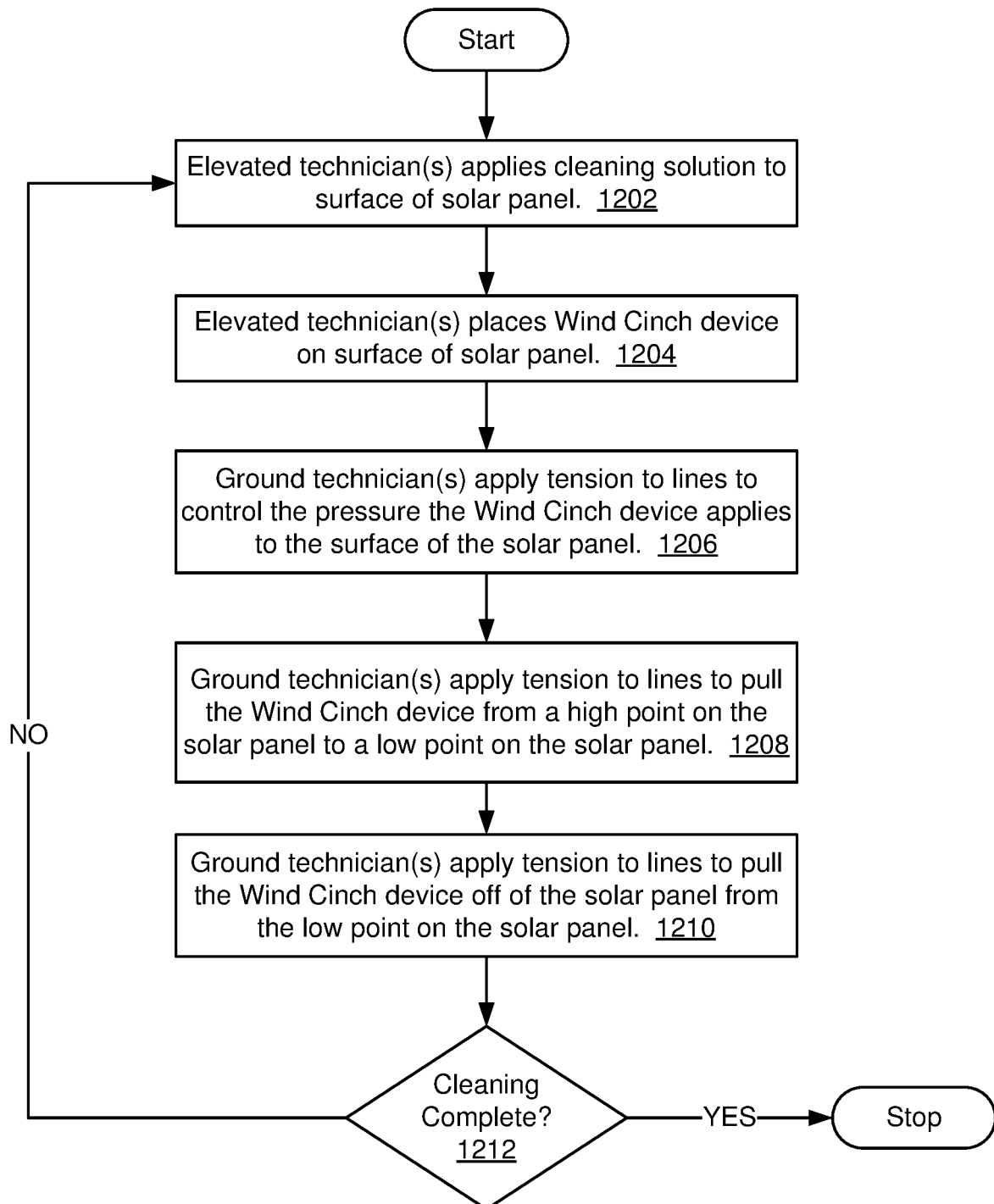
FIG. 12 is a flowchart showing an exemplary method of cleaning a solar panel using a Wind Cinch device.

The Wind Cinch devices described herein can also be used to clean solar panels. FIG. 12 is a flowchart showing an exemplary method of cleaning a solar panel using a Wind Cinch device. At step 202, one or more technicians apply cleaning solution to the surface of the solar panel that is to be cleaned. Because solar panels are often installed in high places, such as the roofs of homes, buildings, garages, or on towers that can rotate and track the sun, elevated technicians can be used to apply the cleaning solution. Any known means for safely elevating a technician above ground level to work on a solar panel can be used. To make practical and utilize by preference, one or two sky lifts, each occupied by a trained technician, equipped with water pressure washers preferably heated and pressurized to 3500 psi commence to spray down the surface of the solar panel with an EPA-approved, colloidal, biodegradable and ecological cleaning solution that can prevent corrosion, discourage contaminant build-up, and improve performance. In alternative embodiments, the cleaning solution can be applied with less pressure, including applying the cleaning solution to the wind turbine blade with a "misting" application to thoroughly soak the surface of the wind turbine blade.

After cleaning solution is applied to the surface of the solar panel at step 1202, one or more elevated technicians place the Wind Cinch device on the surface of the solar panel that is to be cleaned (step 1204). At step 1206, ground technicians apply tension to one or more lines to control the pressure that the Wind Cinch device applied to the surface of the solar panel. At step 1208, ground technicians apply tension to one or more lines to pull the Wind Cinch device from a high point on the solar panel (i.e., farther from ground level) to a low point on the solar panel blade (i.e., closer to ground level), thereby cleaning the surface of the solar panel. Ground technicians can apply tension by way of human action pulling on the lines. Ground technicians can apply tension through mechanical means such as using a winch or moving a vehicle to which the lines are attached. Elevated technicians can also apply tension to lines, for example, to counteract the tension pulling the Wind Cinch device to a lower point on the solar panel, thereby regulating the speed with which the Wind Cinch device moves across the surface of the solar panel. At step 1210, when the Wind Cinch device has reached a low point on the solar panel, ground technicians apply tension to the lines to pull the Wind Cinch device off the solar panel. At step 1212, if cleaning is complete then the process ends. At step 1212, if cleaning is complete then the process ends. At step 1212, if cleaning is not complete then the process can return to step 1202 where more cleaning solution is applied to the solar panel, and the remaining steps are repeated as needed.

Figure 13:
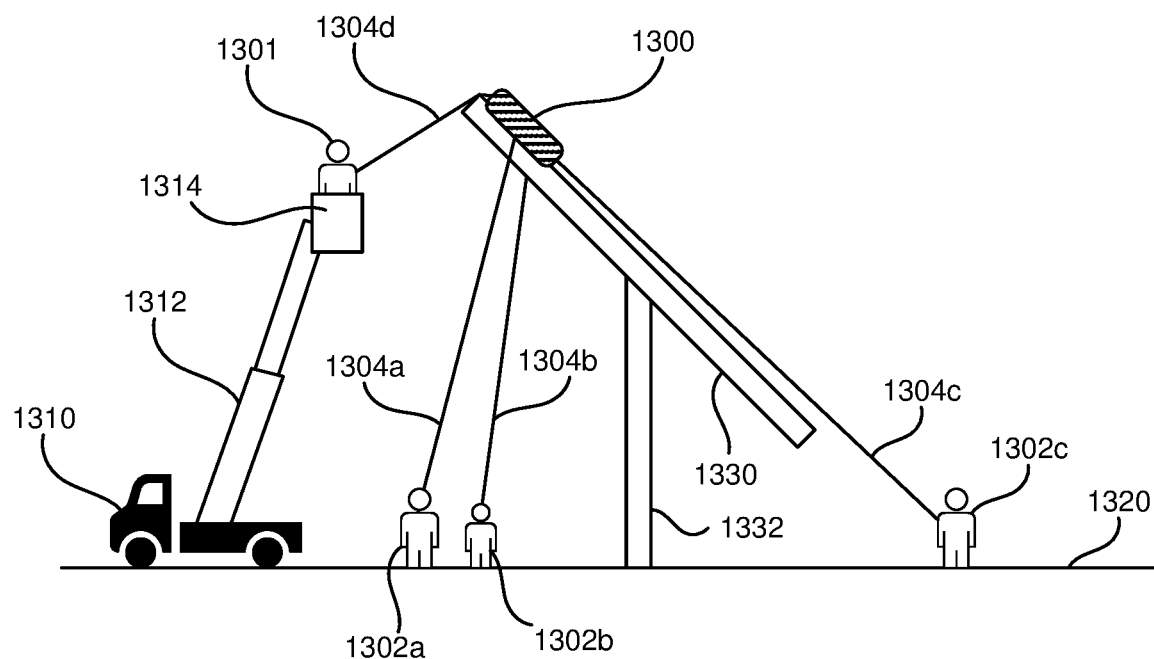
FIG. 13 is a diagram showing a side view of exemplary positioning of technician(s) for cleaning a solar panel with a Wind Cinch device.
Figure 14:
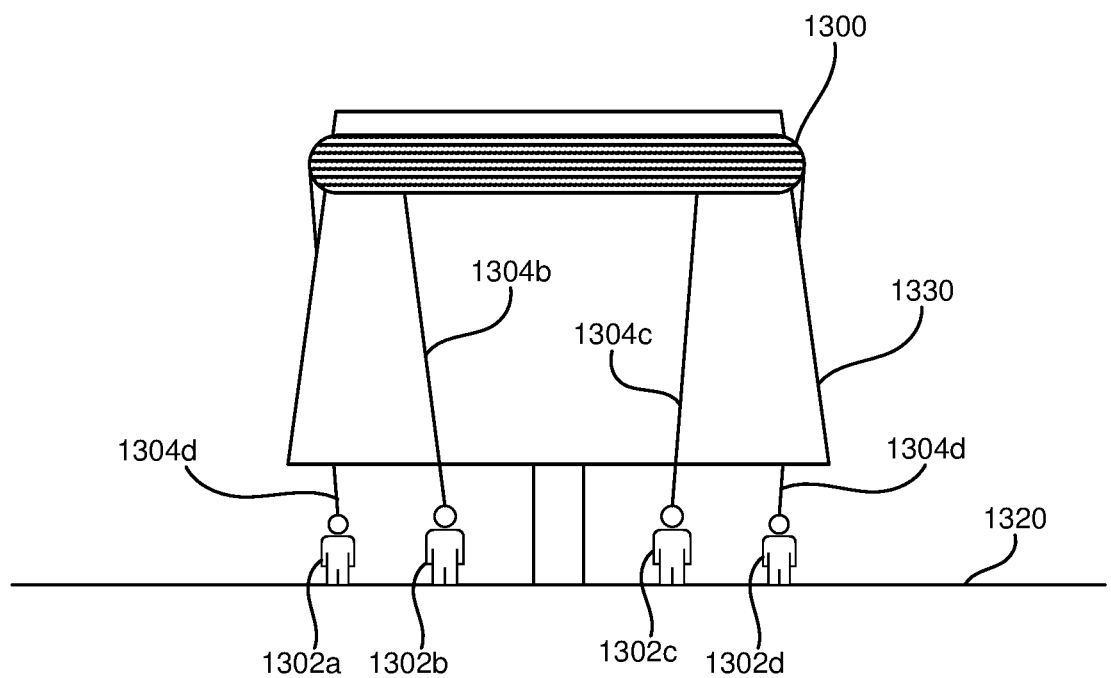
FIG. 14 is a diagram showing a front view of exemplary positioning of technician(s) for cleaning a solar panel with a Wind Cinch device.

FIG. 13 is a diagram showing a side view of exemplary positioning of technician(s) for cleaning a solar panel with a Wind Cinch device. FIG. 14 is a diagram showing a front view of exemplary positioning of technician(s) for cleaning a solar panel with a Wind Cinch device. In the example shown in FIGS. 13 and 14, solar panel 1330 is mounted at an angle on mast 1332. In other examples, solar panel 1330 can be installed on a roof or other elevated place, and with or without a mast. Elevated technician 1301 is elevated above ground level 1320. Elevated technician 1301 can be elevated above ground level by way of skylift 1312 in skylift bucket 1314. Skylift 1312 can be attached to truck 1310. For solar panels located on a roof, elevated technicians can be elevated above the ground by standing on the roof. Being elevated above ground level 1320 places elevated technician 1301 in a position to perform certain tasks on solar panel 1330, such as applying cleaning solution and placing the Wind Cinch device on the surface of the solar panel. Ground technicians 1304a-d are located at ground level to perform tasks that cannot be performed from an elevated position.

Lines 1304a-d are connected to Wind Cinch device 1300. Lines 1304a-d can be cords, ropes, cables and the like. Lines 1304a-d can also include telescoping pipes or rods that can be extended to reach the Wind Cinch device from ground level. The telescoping pipes or rods can be made of metal, preferably stainless steel to resist corrosion. Ground technicians 1302a-d can use lines 1304a-d to perform steps 1206, 1208, and 1210. For example, ground technicians 1302a and 1302b can pull on lines 1304a and 1304b to control the pressure Wind Cinch device 1300 applies to the surface of solar panel 1330, as described in step 1306. Ground technicians 1302c and 1302d can use lines 1304c and 1304d to pull Wind Cinch device 1300 from a high point on solar panel 1330 (i.e., farther from ground level 1320) to a low point on solar panel 1330 (i.e., closer to ground level 1320), thereby cleaning the surface of solar panel 1330 as described in step 1208. Ground technicians 1302c and 1302d can use lines 1304c and 1304d to pull Wind Cinch device 1300 off of solar panel 1330 as described in step 1210, for example, pulling on telescoping poles to drag the Wind Cinch device across the surface of the solar panel.

RESOURCES AND GLOSSARY FOR A "WIND CINCH" OR WRAP AROUND APPARATUS FOR CLEANING A WIND TURBINE BLADE

BIODEGRADABILITY—capability of organic matter to be decomposed by biological process.

CHLORINATION—process of adding chlorine to water to inhibit bacterial growth.

CLOTH—tightly woven material commonly used in car washes and may be cut to desired lengths.

CORROSION—break down or deterioration of materials or properties with the material composition due to reactions, i.e. water, chemicals, dust, sand, wind or heat.

DRYING AGENT ARCH—rinses and applies a wax type product that promotes water beading for better drying processes.

FOAM CLOTH/SPONGE—closed cell foam materials that are light weight, does not absorb water, and will be used on the wrap around "Wind Cinch" (aka NEO-GLIDE).

HIGH PRESSURE WASHER—preferably a handheld device that blasts high pressure, heated water to the high-pressure cleaning components to blades.

LOW PRESSURE WASHER—same as above, only lower blasts of pressure.

PRE-SOAK APPLICATION—first step in cleaning the blades. The act of applying a solution/water to the blade prior to the wash.

WASH—term refers to high pressure spray or the use of detergent solutions on the blade.

PRESSURE WASHER—a mechanical device that uses high-pressure water to remove grime, dust, mud, insects or birds that have been accumulated on edge of blade.

PSI—pounds per square inch of pressure.

SPOT FREE SYSTEMS—processes any water supply into spot free water (AKA RO Systems, reverse osmosis systems).

COMPONENTS THE "WIND CINCH" CAN BE MADE OF THE FOLLOWING MATERIALS: PERMASOFT™, ALCANTARA, SHAMMY-DRY™, NEO-GLIDE®

PERMASOFT™—a foam material with velvet-like fiber fingers that hold just the right amount of water and chemicals for high efficiency.

ALCANTARA—new and improved wash material from PERMASOFT. Alcantara is a synthetic textile material. Alcantara is a soft, suede-like microfiber pile and is noted for its durability. Alcantara is composed of about 68% polyester and 32% polyurethane, giving increased durability and stain resistance. The appearance and tactile feel of the material is similar to that of suede.

SHAMMY-DRY™—a synthetic chamois leather product that is a perfect material for absorbing water while buffing and drying.

NEOGLIDE®—another material for gentle, smooth and superior washing. NEOGLIDE® inhibits water absorption and resists grit and dirt from becoming imbedded into the material, so there is no disturbance of the surface it is cleaning.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A wind cinch device for cleaning a wind turbine blade, comprising:
   a main body, the main body being an elongated member having a first end and second end and a cleaning surface that can stretch, flex and absorb water and is sufficient in length to form a loop around a wind turbine blade when wrapped around a wind turbine blade;
   the first end and second end each including at least one of a plurality of end straps;
   one or more cinching lines to control the pressure that the wind cinch device applies to the wind turbine blade;
   one or more rigging lines to pull the wind cinch device from a high point on the wind turbine blade to a low point on the blade, the one or more rigging lines being different lines from the one or more cinching lines; and
   a plurality of rigging points adapted to receive the one or more cinching lines and the one or more rigging lines, the plurality of rigging points including:
   at least two rigging point positioned on each of the plurality of end straps; and at least two rigging point positioned between the plurality of end straps on the main body positioned approximately halfway between the plurality of end straps at opposite first and second ends of the main body;
   wherein applying tension to the one or more of the cinching lines changes the circumference of the loop formed by wrapping the wind cinch device around the wind turbine blade to maintain the cleaning surface in sufficient contact with the surface of the wind turbine blade to clean the wind turbine blade.

2. The wind cinch device of claim 1, wherein at least the cleaning surface of the main body comprises materials suited for automotive car wash applications.

3. The wind cinch device of claim 1, wherein the main body is a single unit having a continuous, integrated cleaning surface.

4. The wind cinch device of claim 1, wherein the main body is comprised of a plurality of strands.

5. The wind cinch device of claim 4, wherein the plurality of strands is held together by one or more reinforcing members.

6. The wind cinch device of claim 1, wherein the cleaning surface includes a foam material with velvet-like fiber fingers.

7. The wind cinch device of claim 1, wherein the cleaning surface includes a microfiber pile composed of polyester and polyurethane.

8. The wind cinch device of claim 1, wherein the cleaning surface includes a synthetic chamois leather.

9. The wind cinch device of claim 1, in which the main body includes two longitudinal edges, and in which different ones of the at least two rigging points positioned approximately halfway between the end straps at opposite first and second ends of the main body are positioned on opposite longitudinal edges.

* * * * *